United States Patent [19]

Blackwood et al.

[11] 3,725,476
[45] Apr. 3, 1973

[54] UNSATURATED AMIDES OF OXYBIS (BENZENESULFONIC ACID)

[75] Inventors: John C. Blackwood, Melrose; Edwin O. Hook, Marshfield; Walter Beck, Bedford, all of Mass.

[73] Assignee: Stepsan Chemical Company, Northfield, Ill.

[22] Filed: Sept. 15, 1971

[21] Appl. No.: 180,850

[52] U.S. Cl........260/556 AR, 260/75 S, 260/77.5 R, 260/79.3 MU, 260/79.3 R, 260/78 SC, 260/79.5 C, 260/456 P, 260/556 H, 204/159.14, 204/159.15, 204/159.16, 204/159.17
[51] Int. Cl............................................C07c 143/78
[58] Field of Search.....................260/556 AR

[56] References Cited

UNITED STATES PATENTS 3,234,190  2/1966  Tashlick......................260/793 MU
3,359,193  12/1967  Pinner..........................204/159.17

Primary Examiner—Henry R. Jiles
Assistant Examiner—S. D. Winters
Attorney—Richard P. Crowley et al.

[57] ABSTRACT

Unsaturated amides of oxybis(benzenesulfonic acid), particularly the mono, di, tri and tetraallyl or methallyl amides, are useful as cross-linking agents for polymeric materials, or as monomers or comonomers in producing allylic-type resins. Such unsaturated amides may be represented by the formula:

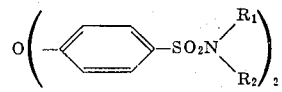

wherein
$R_1$ is a $C_2$—$C_{12}$ alkenyl radical wherein the terminal carbon atom has two hydrogen atoms and is bonded to the penultimate carbon atom by means of a double bond; and
$R_2$ is a $R_1$ radical, a $C_1$—$C_6$ alkyl radical, a phenyl radical or hydrogen.

7 Claims, No Drawings

UNSATURATED AMIDES OF OXYBIS (BENZENESULFONIC ACID)

BACKGROUND OF THE INVENTION

For many purposes, it is advantageous to create physical cross-linking in the structure of a normally linear and thermoplastic polymer. The dimensional stability of the polymer, particularly against thermal shrinkage and distortion, can usually be enhanced in this manner. Cross-linking may also augment the chemical resistance of the polymer, especially against the action of various solvents, and often serves to modify significantly the physical characteristics of the polymer or shaped articles made therefrom. For example, a given polymeric composition that normally is relatively flexible or elastic can often be stiffened considerably by cross-linking the polymer. This stiffening can often be accomplished after the polymer has been formed into a shaped article. Thus, a thermoplastic polymer can be fabricated by conventional techniques, such as molding or extrusion into a desired form; e.g., rod, film, etc., while in an easily workable, plastified condition, and later, in such form or another, can be expediently cross-linked to produce a desirably stiff, rigid and high melting shaped or molded article.

Cross-linking agents containing unsaturated radicals, such as two or more unsaturated groups; e.g., allyl groups, are often employed to improve the physical and chemical properties of various polymers. Such well known cross-linking agents as triallyl cyanurate, triallyl phosphite, diallyl phthalate, trimethylolpropane trimethacrylate and other di and tri-functional compounds, are employed to improve the performance of polymers to provide highly cross-linked polymeric structures of improved stiffness at elevated temperatures and enhanced heat resistance (see U.S. Pat. No. 3,359,193). The cross-linking agent reaction with polymers is a typical vinyl polymerization reaction which is carried out in the presence of a free-radical generating catalyst system, such as a peroxide, or azonitrile catalyst, or by the use of radiation or any combination thereof.

Oxybis(benzenesulfonyl hydrazide) is a commercially produced product used as a blowing agent in rubbers for the production of cellular-rubber products (see U.S. Pat. No. 2,626,933 and U.S. Pat. No. 2,552,065). This blowing agent is prepared by reacting oxybis(benzenesulfonyl chloride) with hydrazine. The intermediate product, oxybis(benzenesulfonyl chloride), is typically prepared by reacting diphenyl oxide with chlorosulfonic acid. The compound produced is a stable but reactive intermediate compound for the preparation of the blowing agent.

SUMMARY OF THE INVENTION

Our invention relates to a new class of unsaturated cross-linking compounds, their use in cross-linking polymers, and in preparing homopolymers and copolymers. Our invention concerns unsaturated compounds of oxybis(benzensulfonic acid), in particular, the unsaturated amides and unsaturated esters of oxybis(benzene-sulfonic acid), as new compounds of matter. Our invention also is directed to the use of these unsaturated oxybis(benzenesulfonyl) compounds, particularly the unsaturated allyl or methallyl amides of oxybis(benzenesulfonic acid), as cross-linking agents and as additives in polymers, and as monomers or comonomers in producing allylic-type resins. More particularly, our invention concerns the di and tetraallyl or methallyl amides of oxybis(benzenesulfonic acid), their use in polymers as cross-linking agents with free-radical generating catalyst systems to enhance the heat resistance and improve the stiffness of the polymers at elevated temperatures, and their use as monomers and comonomers in producing high-temperature-resistant allylic-type resins.

The unsaturated compounds of our invention may be represented by the formula (I) wherein R is an unsaturated radical containing, for example, one two, three or more ethylenically unsaturated carbon-to-carbon bonds, and particularly, wherein R contains an olefinic radical wherein the terminal carbon atom bears two hydrogen atoms and is bonded to the penultimate carbon atom by means of a double bond, for example, an allyl, methallyl, ethallyl or vinyl radical, bonded directly to an intermediate oxygen or nitrogen atom which is bonded to the sulfur atom.

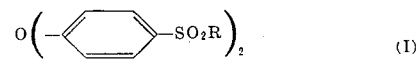  (I)

In one embodiment of our invention, R may represent an ester radical ($OR_1$), and in another embodiment of our invention, R may represent an unsaturated amide radical

$R_1$ represents an olefinic-containing radical, such as a radical containing one, two, three or more ethylenically unsaturated bonds, subject to cross-linking in the presence of a free-radical generating catalyst system.

$R_1$ may represent an aliphatic or a cycloaliphatic radical, such as an alkenyl $C_2$–$C_{12}$ radical, or a vinyl or alkylene-substituted aromatic radical, such as a $C_2$–$C_6$ alkylene-substituted phenyl. Preferably, $R_1$ is a $C_2$–$C_6$ alkenyl radical, such as a vinyl radical, an allyl radical, or a $C_1$–$C_6$ allyl or phenyl-substituted allyl radical, such as methallyl, ethallyl, propallyl, butylallyl, cyclohexylallyl, or phenylallyl radicals.

$R_2$ represents the same or a different $R_1$ radical or hydrogen, or an aliphatic, cycloaliphatic, aromatic; e.g., phenyl or alkylaryl; e.g., alkyl phenyl radical. Preferably, $R_2$ is a phenyl or $C_1$–$C_4$ alkyl phenyl or a $C_1$–$C_6$ alkyl radical, such as a methyl, ethyl, propyl, butyl, cyclohexyl radical.

The unsaturated esters of oxybis(benzenesulfonic acid) of our invention may be prepared by an esterification reaction through reacting an oxybis(benzenesulfonic acid halide), such as the bromide, chloride, iodide or fluoride, but particularly preferred is the bromide or chloride, with a hydroxy-containing unsaturated compound, such as, for example, an unsaturated alcohol; e.g., a $C_3$–$C_{12}$ alkenol, such as allyl alcohol or an alkyl-substituted allyl alcohol, such as methallyl alcohol, to produce the corresponding allyl or methallyl compounds. Further, unsaturated ester compounds of our invention containing acrylic radicals may be produced, for example, by reacting the oxybis(benzenesulfonic acid halide) with a hydroxy alkyl acrylate or methacrylate; for example, the reaction of oxybis(benzenesulfonic chloride) with hydroxy propyl or hydroxy ethyl acrylates and methacrylates, to produce the corresponding acrylic esters. Typical ester compounds suitable for use as cross-linking agents include, but are not limited to: diallyl oxybis(benzenesulfonate), dimethallyl oxybis(benzenesulfonate), divinyl oxybis(benzenesulfonate), di(beta methacryloxyethyl) oxybis(benzene-sulfonate), di(beta methacryloxypropyl) oxybis(benzenesulfonate).

The preferred monomers of our invention for use as cross-linking agents are the unsaturated amides of the oxybis(benzene-sulfonic acid), since such compounds may contain up to four unsaturated groups therein where the nitrogen atom on each end may contain one or two unsaturated groups, and more particularly wherein our compounds are the diallyl and tetraallyl oxybis(benzenesulfonamides).

The unsaturated amides of our invention would include, but not be limited to: diallyl oxybis(benzenesulfonamide), tetraallyl oxybis(benzenesulfonamide), N,N'-diallyl-N,N'-dimethyl oxybis(benzenesulfonamide), N,N'-diallyl-N,N'-diethyl oxybis-(benzenesulfonamide), N,N'-diallyl-N,N'-dibutyl oxybis(benzenesulfonamide), dimethallyl oxybis(benzenesulfonamide), tetramethallyl oxybis(benzensulfonamide), N,N'-dimethallyl-N,N'-dimethyl oxybis(benzenesulfonamide), N,N'-diallyl'N,N'-diphenyl oxybis-(benzenesulfonamide), N,N'-diallyl-N,N'-dicyclohexyl oxybis(benzenesulfonamide), N,N'-dimethyl-N,N'-divinyl oxybis(benzenesulfonamide), N,N'-diethallyl-N,N'-dimethyl oxybis(benzenesulfonamide), and N,N'-diallyl-N,N'-di-(p-t-butylphenyl) oxybis(benzenesulfonamide).

The unsaturated amides of our invention are represented by the formula (II):

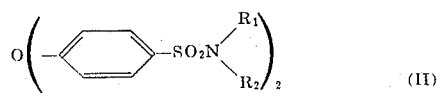

(II)

The particularly preferred compounds to be employed as cross-linking agents will be those allyl amides containing two, three, or four unsaturated radicals, such as the di and tetraallyl or methallyl compounds. The amides employed as monomers or comonomers for the production of high-temperature-resistant resins may contain from one to four of the unsaturated groups.

The unsaturated oxybis(benzenesulfonamide) compounds of our invention may typically be prepared by: first, reacting a primary or secondary amine containing the desired unsaturated group with an oxybis(benzenesulfonyl halide), such as the chloride, bromide, fluoride or iodide, preferably, the chloride, to form the corresponding unsaturated amide of the oxybis(benzenesulfonyl) compound, such as, for example, by the reaction of a mono or diallyl amine or a mono or di C₁—C₄ alkyl-substituted allyl amine with oxybis(benzenesulfonyl chloride) to produce the corresponding di or tetraallyl amide compound.

Further, the unsaturated amides of our invention may be prepared, for example, by reacting a mono or primary amine with an oxybis(benzenesulfonyl halide) to produce the corresponding di substitute amide, and then, further substituting the hydrogen atom on the nitrogen by an unsaturated group by reacting an unsaturated halide with the di-substituted amide replacing the hydrogen on the nitrogen atom with the unsaturated group. More particularly, the reaction may be the reaction of a monomethyl, ethyl, propyl, or tertiary butyl monoamine with oxybis(benzenesulfonyl chloride) to produce the corresponding di-substituted amide, and then further, reacting this amide with an allyl halide, such as allyl chloride, or an alkyl-substituted allyl chloride, to produce the corresponding diallyl or dimethallyl dialkyl-substituted amides of our invention. Our unsaturated amides of oxybis(benzenesulfonyl) compounds may be prepared by carrying out the reaction in bulk or, preferably, in an organic solvent, such as toluene, benzene, tetrahydrofuran, or xylol, with stirring for 10 to 60 minutes. The reaction is exothermic, and typically, the reaction is started out at ambient temperatures such that the reaction temperature ranges from 20° to 90° C.

Our unsaturated oxybis(benzenesulfonyl) compounds may be employed alone or in combination with other cross-linking agents or other additives commonly employed in polymers, such as plasticizers, antioxidants, stabilizers, fillers, pigments, flame retardants, catalysts, etc.. Typically, our compounds may be employed in amounts ranging from 0.1 to 30 percent by weight; for example, 2 to 20 percent by weight, of the polymer. Our cross-linking agents may be employed in combination with triallyl cyanurate, diallyl phthalate, triallyl phosphite, trimethylolpropane trimethacrylate, and other cross-linking agents. Our cross-linking agents may be dispersed, blended, milled, padded, absorbed, impregnated or otherwise added to or incorporated into the polymer in which they are to be employed as cross-linking agents. For example, the unsaturated oxybis(benzene-sulfonyl) compounds may be added directly to the polymer or dispersed or solvated in a liquid carrier or in a plasticizer of said polymer or through a polymer solution or emulsion, or may be milled or mechanically blended at the desired concentration with pellets or powder of the polymer, followed by blending at a temperature above the polymer-softening point.

Our invention also comprises a method of incorporated our cross-linking monomers with a synthetic polymer or comonomer that is in substantially non-cross-linked form, and, thereafter, effecting free-radical polymerization and cross-linking of the mixture. Our unsaturated compounds employed as cross-linking agents are employed in the presence of a free-radical generating system, for example, a radiation or peroxide or azonitrile-curing agent as a catalyst.

The free-radical polymerization generally can be induced by known means for generating free radicals, such as by radiation or by the use of peroxide-type or other free-radical chemical additive initiators. In one procedure, the free-radical polymerization is effected by exposing the intimately mixed polymer or comonomer and the cross-linking monomer to a field of high energy radiation. However, the free-radical polymerization can also be induced through the addition of a free-radical-producing chemical agent to the polymer/cross-linking monomer blend and the subsequent activation of this initiating agent by the application of heat to the blend.

Using the method of our invention, shaped polymeric articles are fabricated by forming a composition comprised of a synthetic polymer or comonomer, our cross-linking monomer, and a free-radical initiator, such as a peroxide or azonitrile, if one is employed, into the desired structure and then effecting free-radical graft polymerization by heating to cross-link the synthetic polymer. This is useful in the production of various articles of manufacture which are comprised of the beneficially cross-linked polymer compositions that have been formed while the composition is in a suitably low melting and plasticized condition for its optimum workability.

In the method of the present invention, the term "-polymer" refers to synthetic polymeric materials, such as: vinyl halide resins like polyvinyl chloride, and copolymers of vinyl chloride with other unsaturated monomers, such as vinyl acetate; olefinic resins, like polyethylenes such as the branched low-density (about 0.910 to about 0.925) polyethylenes having melting points in the range of 90° to 110° C., medium and linear high-density polyethylenes made by the Ziegler and Phillips processes, polypropylene, chlorinated polyethylene elastomer, and other $C_2$—$C_4$ olefin polymers and copolymers; natural and synthetic rubbers, such as cis-polybutadiene, polyisoprene, ethylene-propylene and ethylene-propylene diene rubbers, butyl rubber, Neoprene rubber, nitrile rubber, and copolymers of butadiene with styrene and/or acrylonitrile; polyesters such as alkyd resins and polyacrylates and polymethacrylates; nylons, such as the aliphatic Nylons 6, 6/6, 6/10, 12, new aromatic nylons including the polyamide of terephthalic acid and a mixture of 2,2,4-and 2,4,4-trimethylhex-amethylenediamines, and such experimental nylons as Nylon 13/13 and Nylon 9; styrene homopolymers and copolymers such as styrene-acrylonitrile and ABS resins, acrylic resins, polysulfone resins, amino resins, urethane resins, etc.. Comonomers other than our cross-linking compounds to be employed in our present invention include, but are not limited to, diallyl phthalate, polyallyl-containing compounds, such as diallyl succinate, diallyl adipate, triallyl cyanurate, as well as other monomers subject to polymerization, such as styrene, acrylic esters and acrylonitrile. Our cross-linking monomers may be polymerized with these comonomers to produce a high-temperature-resistant resin.

In carrying out the method of our invention, the cross-linking monomer is thoroughly blended with the synthetic polymer or comonomer. Optimum results are obtained when the synthetic polymer is in a substantially uncross-linked state at the time the components are admixed. The synthetic polymer or comonomer and cross-linking monomer may be thoroughly blended by conventional blending techniques, such as by the use of a differential roll mill, a Banbury mixer or other similar masticating equipment, or by "dry blending" the monomer into the powdered polymer in a ribbon blender or suitable tumbling equipment. The temperature of the polymer/cross-linking monomer mixture during the blending procedure is usually not critical provided that the temperature is not high enough to cause degradation of the polymer or initiate thermal cross-linking. Optimum blending is often obtained when the polymer is heated to a temperature above its second order transition temperature.

The amount of our cross-linking compound to be incorporated in the polymer or comonomer blend depends upon the specific nature and characteristics of the polymer to be cross-linked, the degree of cross-linking desired, the cross-linking potency of the particular cross-linking agent that is involved, the transient properties desired in the uncross-linked composition for purposes of fabrication and the final properties desired in the resulting cross-linked composition. Generally, the stiffness or rigidity of a cross-linked composition increases with the degree of cross-linkage. Hence, the quantity of the cross-linking compound employed should be chosen to secure the desired extent of cross-linking, and, therefore, stiffness in the polymeric composition without induction of excessive brittleness. Generally, a satisfactory result may be achieved when a minor proportion of the cross-linking compound is intimately incorporated in the polymer. In some instances, very small proportions of the cross-linking agent with suffice, especially when relatively low levels of cross-linking are desired in the final product.

It is desirable to utilize such a quantity of the monomer to provide at least one functional cross-linkage, and conveniently between one and say about one hundred functional cross-linkages per every ten thousand carbon atoms in the chains of the basic polymer. It is frequently advantageous to incorporate an amount of the cross-linking compound in the polymer that is between about 0.1 and up to about 30 percent by weight, based on the weight of the polymer, but an amount between about 2 and 10 percent by weight is usually sufficient for most purposes, and is adapted to produce a wide range of physical properties. When employed with a comonomer other than the cross-linking compound, the proportions to be used will be determined by the properties desired in the final resin product.

The desired cross-linking or graft cross-linking is effected by initiating free-radical graft polymerization between the cross-linking monomer and the synthetic polymer. Preferably, this free-radical polymerization is induced by subjecting the plastic composition to high-energy radiation, or by the addition of peroxide or other free-radical generating agents.

The high-energy radiation employed to cross-linked the polymer composition should have an intrinsic energy greater than the typical electron-binding energies of a few electron volts, and be capable of penetrating the processed materials. Such high energy and penetration is conveniently available as beta or gamma radiation from, for example, radioactive cobalt, nuclear, reaction fission products and the like. However, if preferred, high-energy radiation from such sources as electron beam generators, X-ray generators and the like may also be utilized with equivalent benefit. It will usually be expedient to employ a high-energy radiation field having an intensity of at least 0.1 megarads per hour to avoid unduly long exposure times. Graft copolymerization or graft cross-linking, under the influence of high-energy radiation, may advantageously and quite satisfactorily be conducted at normal room temperatures. Thus, the difficulties encountered in thermal cross-linking processes, with or without catalysts, are avoided.

The preferred radiation dosage to induce cross-linking is between about 1 to 20 megarads, although a greater dosage may be utilized, if it is deemed necessary. Obviously, greater economic benefits accrue when low dosages are employed. Thus, in most cases, it is advantageous to employ a dosage of 1 to 5 megarads. This is not only economically feasible, but ordinarily produces optimum properties and achieves greatest benefit in the cross-linked products derived from the polymer compositions. Greatly excessive dosages should be avoided to prevent degradation or decomposition of the compositions being cross-linked, especially after all or substantially all of the cross-linking agent has become cross-linked in the polymeric composition. Irradiation may be carried out in a vacuum or in an inert atmosphere, such as a nitrogen gas atmosphere. Irradiation may be done just before addition of our cross-linking compound and after addition.

In addition to high-energy radiation, chemical free-radical initiators may be employed to effect cross-linking. Chemical free-radical initiators are well known and can be employed in the method of the present invention to obtain the desired cross-linking between the polymer and our cross-linking compound. In general, the procedure followed for forming cross-linked polymers using chemical free-radical initiators is to compound the polymer or comonomer, free-radical initiator and cross-linking agent using conventional blending equipment such as Brabender Plastograph, Banbury Mixer or two-roll mill, at a temperature about 10° to 30° C above the softening point of the polymer, but below the gel point, for about 5 to 20 minutes. It is also possible to mix the reactants, preferably in particulate form, at temperatures below the softening point of the polymer; e.g., at 25° C, and, thereafter, heat the mixture above the softening point of the polymer to form a homogeneous mixture in the molten polymer. It is also sometimes preferred, especially where there is concern with premature cross-linking in the mixing or compounding step, to mix solely the polymer and the cross-linking monomer at temperatures at which the polymer is molten until a homogenous mixture is obtained; e.g., about 5 to 20 minutes, and thereafter, add the initiator with continued mixing for an additional 1 to 10 minutes. The polymer composition can then be shaped using standard methods and equipment into films, tubes, wire insulation, molded articles and the like. During the forming operation, sufficient heat can be applied to actuate the free-radical initiator and effect the cross-linking. In an alternate procedure, the free-radical polymerization and resultant cross-linking is accomplished by subsequently curing the shaped material in a mold at a temperature above its gel point.

Organic compounds capable of generating free radicals suitable for use in the present invention include azo compounds like azonitriles and azoamides, such as α, α'-azobis(isobutyronitrile), α, α'-azobis(cyclohexanecarbonitrile); 2-phenylazo-2,4-dimethylvaleronitrile; 2-phenylazoisobutyronitrile; 2-phenylazoisobutyramide and the like. Free-radical catalysts may also include, but not be limited to, peroxides, such as diacyl (e.g., benzoyl peroxide, lauroyl peroxide, 2,4-dichlorobenzoyl peroxide); peroxy esters; e.g., tertiary butyl peroxy benzoate, tertiary butyl peroxy acetate, tertiary butyl peroxy isobutyrate; alkyl peroxides; e.g., ditertiary butyl peroxide, dicumyl peroxide; hydroperoxides; e.g., tertiary butyl hydroperoxide, cumene hydroperoxide, ketone peroxides; e.g., methylethyl ketone peroxide, acetyl acetone peroxides; as well as dibasic acid peroxides, sulfonylacyl peroxides, peroxy carbonates, peroxy dicarbonates, tertiary alkyl perketals, and the like. The amount of the catalyst used may range from 0.01 to 5 percent by weight of the polymer; for example, 0.1 to 3.0 percent.

The temperature at which cross-linking of the polymer containing our unsaturated oxybis(benzenesulfonyl) compound is carried out depends on the particular catalyst system employed. For ionizing radiation, temperatures of 10° to 50° C may be employed, while for the use of chemical additives, such as peroxides, the processing temperature to effect cross-linking is related to the half-life of the catalyst, and, typically, may range from 20° to 150°C; for example, 50° to 100°C.

Typically, our cross-linking agents should be compatible with the polymer into which they are to be incorporated. When employed as cross-linking agents in polymers, our compounds, in part, enhance thermostability of the polymers and produce highly cross-linked and polymeric structures. Our compounds improve the heat resistance of polymers in which they are incorporated, and contribute improved stiffness at elevated temperatures in such polymers. For example, when employed in a vulcanizate, our compounds increase the modulus and tensile strength in comparison to polymers having no cross-linking agent therein, and reduce the elongation. Our polymers may be used to improve the adhesion of tire cords when incorporated into adhesive formulations and to improve the high-temperature physical properties of polymers, and in wire and cable insulation and in hose and belting products.

Also our unsaturated oxybis(benzenesulfonyl) compounds may be employed as monomers and comonomers to produce high-temperature-resistant resins. Homopolymers may be prepared by reacting the unsaturated compounds, such as the tetraallyl oxybis)benzene-sulfonyl amide) compounds, in the presence of a free-radical generator, such as benzoyl peroxide, and heating to produce the homopolymer, either in solvent or in bulk. Copolymers may be prepared by copolymerizing reaction of, for example, the tetraallylamide compounds with other allyl monomers, such as diallyl phthalate, in the presence of a catalyst, and irradiating to produce high-temperature allylic-type resins.

For the purposes of illustration only, our invention will be described by the preparation of unsaturated oxybis(benzenesulfonyl) compounds and their use as cross-linking agents in copolymers in the following examples.

DESCRIPTION OF THE EMBODIMENTS

Example 1

N,N'-Diallyl Oxybis(benzenesulfonamide)

A solution of 29 g. (0.5 mole) of monoallylamine in 100 ml. of toluene was charged to a 500-cc. round-bottomed flask equipped with a stirrer, thermometer, reflux condenser, and addition funnel. A solution of 36.7 g. (0.1 mole) of oxybis(benzenesulfonyl chloride) in 150 ml. of warm toluene was run in over a period of 15 minutes, with vigorous stirring. During the addition, the temperature of the mixture rose to 75°C and slight refluxing of the amine occurred. When all was in, the reaction product consisted of a mixture of toluene solution and a pinkish oil.

The mixture was stirred and heated at 75°C for one hour. After 5–10 minutes, the oily layer crystallized. Increasing the temperature to above 80°C caused remelting to a heavy amber insoluble syrup. From this the toluene solution was decanted while hot, cooled to room temperature, and the resulting slurry filtered, yielding 6 g. of off-white crystals, m.p. 126°–9°C.

The syrupy residue was also cooled to room temperature and treated with 300 ml. of cold water, producing a crystalline slurry. This was filtered and the solid product recrystallized from methanol; yield 11.8 g. of glistening white crystals, m.p. 127°–30°C. Dilution of the methanolic mother liquor with one-fourth its volume of cold water yielded an additional 21 g., m.p. 128°–30°C, bringing the total recovery to 38.8 g. (95 percent of theory).

All of the fractions were combined and recrystallized from methanol (ca. 225 ml.), yielding 35.7 g. of product (87.5 percent of theory), m.p. 126°–8°C.

Example 2

N,N,N',N'-Tetraallyl Oxybis(benzenesulfonamide)

To a solution of 49 g. (0.5 mole) of diallyl amine in 100 ml. of tetrahydrofurane in a 500-cc. reaction flask was added, dropwise and with good stirring, a solution of 36.7 g. (0.1 mole) of oxybis(benzenesulfonyl chloride) in 150 ml. of tetrahydrofurane. The addition required about 20 minutes, during which the temperature of the mixture rose to 63°C and amine hydrochloride crystallized out. To complete the reaction, the mixture was stirred and heated under reflux (71°C) for 1¼ hours.

After chilling to 10°C, the mixture was filtered and the cake of amine hydrochloride washed with a small amount of chilled tetrahydrofurane. The combined filtrate and washings were concentrated on the hot plate to about half volume (175 ml.), cooled to room temperature, and treated with 500 ml. of cold water. The oil which separated crystallized on standing. After several hours in the refrigerator the mixture was filtered and the product washed well with cold water; yield 49 g. (100 percent) of cream-colored solid. Recrystallization from methanol (ca. 225 ml.) yielded 43.7 g. (90 percent) of nearly white crystals, m.p. 85°–7C. Dilution of the methanol mother liquor with half its volume of cold water produced a 1.8 g. second crop, bringing the total recovery of recrystallized material to 93.7 percent of theory.

Example 3.

N,N-Dimethyl-N,N'-Diallyl Oxybis(benzenesulfonamide)

Sodium, 4.6 g. (0.2 mole) was added to 58 g. (1 mole) of allyl alcohol and the mixture stirred and heated at 70°C until the solution of the sodium was complete. 35.6 g. (0.1 mole) of oxybis(benzenesulfonyl) dimethylamide was added and the mixture stirred and heated at 80°C for 10 to 15 minutes, producing a thick, barely stirrable slurry. Allyl chloride, 30.6 g. (0.4 mole), was added slowly through the reflux condenser. Vigorous refluxing occurred, cooling the mixture to about 60°C. The mixture was stirred and heated under reflux at 60°C for 2 hours, at which point, the reaction temperature (initially 60°C) had increased to 68°C, and the slurry had become much thinner.

After standing overnight, refluxing was continued for an additional hour and a half, at which point the reaction temperature had increased to 78°C. Two additional hours of reflux resulted in no further change.

The reaction mixture was filtered hot, and the solid precipitate washed with a small amount of allyl alcohol, and finally with acid. On drying, 9¼ g. (81 percent of theory) of sodium chloride was obtained. The mother liquor was diluted with 200 cc. of cold water and the heavy oil that separated taken up in 200 cc. of ether. The ether layer was washed with two 50 mls. portions of cold water, and the ether removed under reduced pressure in a rotary evaporator to produce 28.9 g. of viscous amber oil. On treatment of the oil with cold methanol, further chilling and scratching, white crystals were obtained, which, after recrystallization, had a melting point of 76° to 80°C and an infrared spectrum in agreement with the expected structure.

In this manner, any alkyl-substituted amide of our invention may be prepared; e.g., butyl, oxybis(benzenesulfonamide), wherein the alkyl amine is substituted for the appropriate unsaturated amine, such as a diallyl amine, where the resulting intermediate is an N,N'-dialkyl-substituted amine oxybis(benzenesulfonic acid amide) compound, which may then be reacted with allyl or methallyl chloride to provide the desired introduction of the allyl or methallyl groups to replace the hydrogen of the monoalkyl amide, thereby yielding an alkyl-substituted allyl sulfonamide of our invention.

Example 4

Diallyl oxybis(benzenesulfonate)

An excess of allyl alcohol (2.5 moles) was added to 1.0 moles of oxybis(benzenesulfonyl chloride) in a flask and the mixture heated to reflux for two hours. The oxybis(benzenesulfonyl chloride) went into solution at about the boiling point of the allyl alcohol. On refluxing, the solution darkened. After refluxing, the excess allyl alcohol was removed on a rotary evaporator and a thick reddish-brown oil recovered as the reaction product. Infrared analysis indicated that the product is the allyl ester with the concentration of allyl groups about the same as in N,N'-diallyl oxybis-(benzenesulfonamide).

A typical wire and cable polyvinyl-chloride resin formulation was prepared as follows:

TABLE I

Wire and Cable PVC Formulation

|   | Percent | Parts by Weight |
|---|---------|-----------------|
| 1. Polyvinyl-chloride resin (Geon 102 EP BF Goodrich Chemical Co.) | 48.7% | 400 |
| 2. Plasticizer - ester of pentaaerythritol (Hercules, Inc.) | 21.3% | 175 |
| 3. Stabilizers - dibasic lead, phthalate, | 4.9% | 40 |
| lead stearate | 0.5% | 4 |
| 4. Filler - treated calcium carbonate | 14.7% | 120 |
| 5. Antioxidant - bisphenol A | 0.3% | 2.5 |
| 6. Flame Retardant - antimony trichloride | 1.1% | 9 |
| 7. Cross-linking agent | 8.5% | 70 |
| Totals | 100.0% | 820.5 |

In this wire and cable formulation, two cross-linking agents of our invention were compared with two commercially known cross-linking agents; to wit, diallyl phthalate and triallyl cyanurate. The catalyst system employed comprises exposing the formulation with the various cross-linking agents to ionizing radiation from a cobalt 60 source in the dosage as shown in megarads (MR). The irradiated polymer containing the cross-linking agents was then tested to determine the various degrees of cross-linking effected by the cross-linking agents.

Example 5

One test to illustrate the degree of cross-linking is to determine the percent elongation at the break point for the various polymeric samples. The samples were elongated at a rate of 12 inches per minute, with the reference length being 2 inches. The results of such elongation test are given in Table II below.

TABLE II

| Test No. | Percent Elongation of Irradiated Polymer Radiation Dosage (Megarads) | | | Cross-linking Agent |
|---|---|---|---|---|
|   | 0MR | 3MR | 5MR |   |
| 1 | 175%* | 112% | 103%* | Tetraallyl Oxybis(benzen sulfonamide) |
|   | 172% | 112% | 97% |   |
| 2 | 134% | 100% | 97% | Diallyl Oxybis(benze esulfonamide) |
|   | 131% | 103% | 97% |   |
| 3 | 169% | 112% | 112% | Diallyl Phthalate |
|   | 178% | 112% | 106% |   |
| 4 | 181%* | 97% | 69% | Triallyl Cyanurate |
|   | 184% | 97% | 81% |   |

*Broke outside reference marks

The test results in the sample indicate that cross-linking results achieved with the tetraallyl and diallyl oxybis(benzenesulfonamide) compounds of our invention are superior to those achieved with the use of diallyl phthalate and comparable with those achieved with triallyl cyanurate.

Example 6.

The polymeric formulation of Table I was again tested after exposure to radiation to determine the degree of cross-linking of the various agents by measuring the percentage of gel. Percent gel is measured by extraction of weighed samples in tetrahydrofurane to remove soluble material followed by drying and reweighing. Unirradiated samples of the same material dissolve almost completely in tetrahydrofurane. The test results on such irradiated formulation are shown more particularly in Table III wherein a 0 percent gel would represent substantially no cross-linking, and 100 percent gel would represent complete cross-linking.

TABLE III

Percent Gel of Irradiated Polymer

| Test No. | Percent Gel at Radiation Dosage | | Cross-linking Agent |
|---|---|---|---|
|   | 3MR | 5MR |   |
| 1 | 29% | 49% | Tetraallyl Oxybis (benzenesul onamide) |
| 2 | 30% | 39% | Diallyl Oxybis (benzenesu fonamide) |
| 3 | 37% | 42% | Diallyl Phthalate |
| 4 | 56% | 63% | Triallyl Cyanurate |

The test results show that both the tetra and diallyl oxybis(benzenesulfonamide) are effective cross-linking agents when compared either by percent gel or by percent elongation tests.

Example 7

A cross-linked polyvinyl-chloride formulation as in Table I having improved resistance to high temperature and increased stiffness at elevated temperatures is prepared by incorporating into the formulation about 15 to 20 phr (parts per hundred parts of resin) of N-N'-dimethyl-N-N'-diallyl oxybis(benzenesulfonamide), and irradiating the formulation in an amount of from about 3 to 5 megarads of radiation.

Example 8

Tetramethallyl oxybis(benzenesulfonamide) is incorporated into a polyvinyl-chloride resin by the dry-blending technique at a level of 25 phr. The resulting blend is extruded into rod using extruder temperatures of 130°–140°C. After irradiation of the samples (2 – 5 megarads) in a cobalt-60 source, the material is found to be cross-linked, as evidenced by increased softening temperature and insoluble gel fractions of over 25 percent.

Example 9

The compounds of Examples 1 and 2 are blended with nylon-12 at a level of 15 phr. Blending is accomplished by tumbling the mixture of nylon-molding pellets and cross-linking monomer in a suitable container on a set of rolls for 30–60 minutes, or until the pellets are uniformly coated with the monomer. The blends are then charged to an extruder and processed into rod, using extruder temperatures of 380°–420°F. Samples of the rod, after irradiation to a dose of 5 megarads, show increases in softening temperature and elastic modulus (especially at elevated temperatures) when compared to unirradiated controls. On extraction with meta cresol at 100°C, higher insoluble gel contents are found, compared to values for unirradiated controls.

Example 10

The products of Examples 1 and 2 at a level of 10 phr, are incorporated into the following polymers by milling on a heated two-roll mill or masticating in a Banbury mixer: polypropylene, low and high-density polyethylene, ethylene-propylene rubber, an ethylene/vinyl acetate copolymer, poly(ethyl acrylate), a commercial ABS resin, and an impact grade of polystyrene. The products, in the form of molded test bars, are irradiated to a dose of 5 megarads in a cobalt-60 source. All samples show increases in softening temperature, elastic modulus, and gel content after extraction with suitably chosen solvents.

Example 11

To the polyvinyl-chloride resin formulation of Table I, there is added twenty-five parts of a tertiary butyl peroxy benzoate as a catalyst, while the cross-linking agent employed is N,N'-dimethyl-N,N'-divinyl oxybis(benzenesulfonamide). This formulation is then extruded about a copper wire as wire insulation at an extrusion temperature of approximately 140° to 150°C, the extruded wire material then chilled and coiled. Subsequently, the coiled material is again heated to complete the cure in coil form at a temperature of about 130° to 145°C for 5 to 40 minutes, thereby producing a peroxide-cured cross-linked polyvinyl chloride having high-temperature physical properties.

Example 12

Diallyl oxybis(benzenesulfonate) in an amount of 10 phr is tumbled with powdered low-density polyethylene (0.92 density), together with 4 phr of benzoyl peroxide-curing catalyst until the powdered mixture is intimately blended. The mixture is then charged in mass to an extruder, and extruded into a rod-like form at a temperature of approximately 130° to 140°C. The rod is then subsequently completely cured by heating from about five to sixty minutes at a temperature of 130° to 140°C in an oven, thereby producing a cross-linked low-density polyethylene having improved strength and mechanical properties, as illustrated by decreased elongation, increased modulus, greater rigidity, and higher gel content than the original polyethylene.

Example 13

To the PVC resin formulation of Table I, there is incorporated as the cross-linking agent a di(beta) methacryloxyethyl oxybis(benezenesulfonate) and twenty parts of tertiary butyl peroxy benzoate as a curing catalyst. The formulation is then molded into a desired shape and heated at a temperature of 130° to 150° C for 5 to 60 minutes to cure the formulation. The cross-linking polyvinylchloride resin exhibits evidence of increased rigidity and decreased elongation as compared to the formulation without the cross-linking agent and catalyst.

Example 14

A chlorinated polyethylene elastomer having enhanced physical properties of a higher modulus and a lower elongation and compression set is provided by preparing the following formulation:

| | Parts by Weight |
|---|---|
| Chlorinated polyethylene elastomer B | 100 |
| Lead Stearate | 1 |
| Dibasic lead phthalate | 4 |
| Epoxy resin | 2 |
| Carbon black | 35 |
| Coated clay | 20 |
| Chlorinated paraffin | 15 |
| Dicumyl peroxide catalyst | 2.5 |
| Tetraallyl oxybis(benzenesulfonamide) | 4.0 |

The polymer is cured by heating at a temperature of approximately 150° to 165°C for 10 to 20 minutes, thereby producing a chlorinated polyethylene elastomer suitable for use as wire and cable insulation, which elastomer has an increased tensile strength and reduced elongation than the formulation without our cross-linking agent.

Example 15

Our cross-linking agents provide certain advantages over the employment of sulfur or other curing agents in elastomers, such as, for example, in ethylene-propylene rubber formulations employed as wire and cable insulation. For example, our cross-linking agent, tetraallyl oxybis(benzenesulfonamide), may be incorporated in the amount of 2.5 phr in an ethylene-propylene rubber, such as NJEPR 404 in one hundred parts, and antioxidant 0.75 parts, a secondary antioxidant 0.75 parts, dicumyl peroxide 7 parts, lead dioxide 3 parts, carbon black 10 parts, treated alumina-silca filler 110 parts and HAF carbon black 40 parts. This formulation on being cured at 15 to 25 minutes at 160°C provides an ethylene-propylene rubber of low compression set, good heat-aging stability, improved scorch safety, high modulus and lower elongation than the same formulation cured with 0.3 phr of sulfur.

Example 16

Our cross-linking compounds, both the sulfonamides and the ester sulfonates, may also be usefully employed in, for example, ethylene-ethyl acrylate copolymers to alter the elongation and modulus properties of such vulcanizates in a peroxide-cured system. In addition, our cross-linking compounds may also be incorporated into, for example, polyvinylidene fluoride, and cured using a radiation dosage of 4 to 7 megarads. In addition, our compounds may be incorporated into highly unsaturated polyester alkyds to produce resins with improved thermal properties, as well as being incorporated into phenolics, such as resorcinol formulations employed as tire cord adhesives, or into vinyl-containing polysiloxane resins to react with the vinyl groups of the polysiloxane resin to improve the mechanical properties of the resulting resin.

Example 17

An allylic-type copolymer employing our cross-linking monomers is prepared, which copolymer is a high-temperature-resistant resin, by mixing 50 parts of the dially oxybis(benzenesulfonamide) compound of Example 2 with 50 parts of diallyl phthalate; heating to solubilize the mixture at a temperature of about 50° to 60°C, and then adding to the mixture about 0.5 to 3 parts of a cross-linking agent, azodiisobutyronitrile, and heating the resulting mixture at a temperature of 50° to 60°C for about 10 minutes or longer until the material copolymerizes into a resinous mass.

Our cross-linking compounds, both the ester and amide compounds, may be homopolymerized by the usual polymerization conditions, or copolymerized with a wide variety of vinyl or allyl-containing or other ethylenically unsaturated compounds to produce a temperature resistance in resins, particularly the allylic-type temperature-resistant resins.

We claim:

1. An oxybis(benzenesulfonamide) compound having the formula:

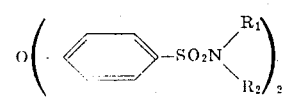

wherein:
R₁ is a C₂–C₁₂ alkenyl radical wherein the terminal carbon atom has two hydrogen atoms and is bonded to the penultimate carbon atom by means of a double bond; and
R₂ is a R₁ radical, a C₁–C₆ alkyl radical, a phenyl radical or hydrogen.

2. The sulfonamide of claim 1 wherein R₁ is selected from the group consisting of a vinyl radical, allyl radical, or methallyl radical.

3. N,N,N',N'-Tetraallyl oxybis(benzenesulfonamide).

4. N,N'-Diallyl oxybis(benzenesulfonamide).

5. N,N'-Dimethyl-N,N'-diallyl oxybis(benzenesulfonamide).

6. N,N,N',N'-Tetramethallyl oxybis(benzenesulfonamide).

7. N,N'-Dimethallyl oxybis(benzenesulfonamide).

* * * * *